(12) United States Patent
Chang

(10) Patent No.: US 6,466,271 B1
(45) Date of Patent: Oct. 15, 2002

(54) METHOD OF SMOOTHLY DISPLAYING FIELD VIDEOS IN AN INTERLACED DISPLAY

(75) Inventor: Feng-Ling Chang, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/418,792

(22) Filed: Oct. 15, 1999

(51) Int. Cl.[7] .................................................. H04N 5/04

(52) U.S. Cl. ........................ 348/550; 348/497; 348/910

(58) Field of Search ................................ 348/550, 910, 348/497, 441, 458, 459; H04N 5/04, 7/01

(56) References Cited

U.S. PATENT DOCUMENTS 6,118,488 A * 9/2000 Huang ........................ 348/448

* cited by examiner

Primary Examiner—Sherrie Hsia
(74) Attorney, Agent, or Firm—J.C. Patents

(57) ABSTRACT

A method of smoothly displaying field videos in an interlaced display according to the invention. In a currently-exiting interlaced display system, the sequence of a scan timing with a top scan timing, a bottom scan timing, a top scan timing, a bottom scan timing . . . , should be consistent to that of field number with a top field, a bottom field, a top field, a bottom field, . . . In the invention, a top or bottom field can be inserted/skipped right after any one field displayed. During inserting/skipping, a new top field which is created from the bottom field or a new bottom field which is created from the top field, is displayed at a corresponding scan timing, thereby efficiently preventing a TV screen from jitters, resulting in smooth display.

6 Claims, 1 Drawing Sheet

METHOD OF SMOOTHLY DISPLAYING FIELD VIDEOS IN AN INTERLACED DISPLAY

BACKGROUND OF THE INVENTION

1. Field of the Invention

The invention relates to a method of displaying field videos, and in particular to a method of smoothly displaying field videos in an interlaced display regardless of being at a top or bottom scanning timing of a TV scanning timing and regardless of inserting or skipping a field right after any one displayed field, thereby preventing a TV screen from jitters.

2. Brief Description of the Related Art

In line with a great progress in science technologies, computers have gradually become indispensable in our daily life. By the use of computers, global information can be rapidly obtained through Internet in advance for businesses. In these years, with the great development of Internet, the amount of information transmitted through computers is increasingly getting large. In addition to text data, it further includes various audio and video data. Multimedia applications with a great amount of audio/video data have become popular in personal computers. Although data can be grabbed through Internet from far remote places, the data transmission is often being in a jam condition due to a great unusual amount of data. In this case, data can not be sequentially received as expected, causing that video and sound is not able to be displayed synchronously, resulting in a poor communication quality. On the other hand, if a receiving terminal has a different timing to a transmitting terminal, the same problem is also encountered. Consequently, how to display video, sound and other types of data synchronously becomes a key issue today.

It is well-known that multimedia signals include video, sound and other types of data signals. A simple way to avoid audio/video signals from being displayed asynchronously is to use the same network signal line for transmission. As such, multimedia signals, such as MPEG signals, can be received synchronously.

However, when restoring an interlaced video source with videos synchronous with sounds, traditional frame skip/insert is no longer suitable. When video and sound is transmitted in a synchronous way, it is necessary to have field skip/repeat. For instance, after inserting/skipping a field, the field polarities of a video source and a TV are inverted until next inserting/skipping operation.

Referring to FIGS. 1A, 1B, schematic views illustrating a traditional method of scanning videos in a normal condition and a field inserted condition, respectively, are shown.

As shown in FIG. 1A, the sequence of a TV scan timing is T, B, T, B . . . , and the sequence of field number is 1T, 1TB, 2T, 2B . . . , wherein T designates top and B designates bottom. As can be obviously known, when the TV scan timing is at a top scan timing, a top field video is displayed on the TV screen. Similarly, when the TV scan timing is at a bottom scan timing, a bottom field video is displayed on the TV screen.

Referring to FIG. 1B, it is assumed that a second field 2T is repeatedly inserted right after a first field 2T is displayed. At this moment, the second field 2T is displayed at a bottom scan timing (B), causing a down jitter on the TV screen. Subsequently, a field 2B is displayed at a top scan timing (T), and a field 3T is displayed at a bottom scan timing (B). As a result, flickers on the TV screen are created due to opposite polarities.

In the case that a subsequent field is skipped right after any displayed field, a similar flicker on the TV screen is also created. Whether a field is inserted or skipped, the problem of flickers generated on the TV screen can not be resolved until another field is inserted or skipped latter.

SUMMARY OF THE INVENTION

In view of the above, the invention is to provide a method of smoothly displaying field videos in an interlaced display. The method of smoothly displaying field videos includes the following steps. First, a top field video is previously displayed at a top scan timing. Next, the top field video is converted into a bottom field video by transform equations. After that, the bottom field video is displayed at a bottom scan timing. The transform equations are given as follows:

$$L(1)=\alpha \times L(2)+(1-\alpha)\times L(1)$$

$$L(2)=\alpha \times L(3)+(1-\alpha)\times L(2)$$

$$L(3)=\alpha \times L(4)+(1-\alpha)\times L(3)$$

$$L(n)=\alpha \times L(n+1)+(1-\alpha)\times L(n)$$

Wherein $L(1), L(2) \ldots, L(n)$ each represents a scan line of a top field video, and $\alpha \times L(2)+(1-\alpha)\times L(1) \sim \alpha \times L(n+L)+(1-\alpha)\times L(n)$ each indicates a scan line of a bottom field video, respectively, where $\alpha$ is an interpolation weighting value with the range of 0 to 1 (i.e., $0<\alpha<1$). Preferably, the interpolation weighting value $\alpha$ is equal to $\frac{1}{8}$ or $\frac{1}{16}$ with which a better vision quality can be attained.

Furthermore, the invention is to provide another method of smoothly displaying field videos in an interlaced display. The method of smoothly displaying field videos includes the following steps. First, a bottom field video is previously displayed at a bottom scan timing. Next, the bottom field video is converted into a top field video by transform equations. After that, the top field video is displayed at a top scan timing. The transform equations are given as follows:

$$L(1)=L(1)$$

$$L(2)=\alpha \times L(1)+(1-\alpha)\times L(2)$$

$$L(3)=\alpha \times L(2)+(1-\alpha)\times L(3)$$

$$L(n)=\alpha \times L(n-1)+(1-\alpha)\times L(n)$$

Wherein $L(1), L(2), \ldots L(n)$ each represents a scan line of a top field video, and $L(1), \alpha \times L(1)+(1-\alpha)\times L(2) \sim \alpha \times L(n-1)+(1-\alpha)\times L(n)$ each indicates a scan line of a bottom field video where $\alpha$ is an interpolation weighting value with the range of 0 to 1 (i.e., $0<\alpha<1$). Preferably, the interpolation weighting value a is equal to $\frac{1}{8}$ or $\frac{1}{16}$ with which a better vision quality can be attained.

In a method of smoothly displaying field videos in an interlaced display according to the invention, field videos can be smoothly displayed regardless of being at a top or bottom scanning timing of a TV scanning timing and regardless of inserting or skipping a field right after any one displayed field, thereby preventing a TV screen from jitters.

BRIEF DESCRIPTION OF THE DRAWINGS

The invention will become more fully understood from the detailed description given hereinbelow and the accompanying drawings which are given by way of illustration only, and thus do not limit the present invention, and wherein.

DETAILED DESCRIPTION OF THE INVENTION

Figure 2:
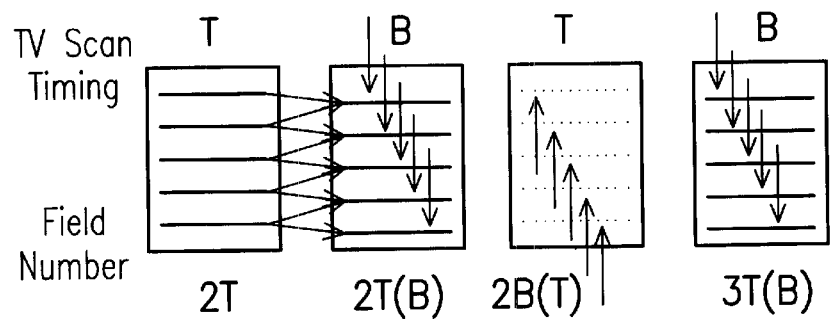
FIG. 2 is a schematic view illustrating a method of smoothly displaying field videos according to an embodiment of the invention.

Referring to FIG. 2, a method of smoothly displaying field videos according to an embodiment of the invention is shown.

Figure 1A:
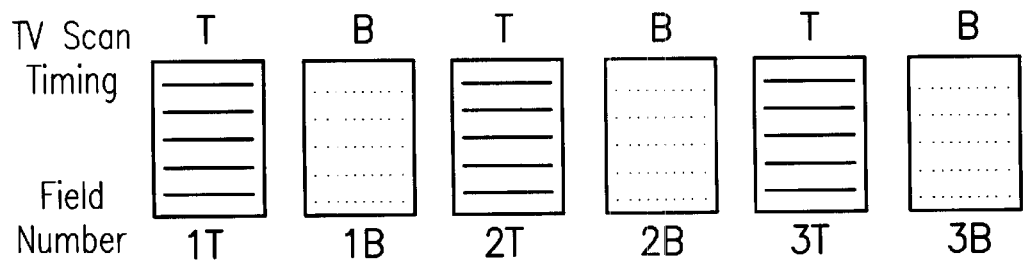
FIGS. 1A, 1B are schematic views illustrating a traditional method of video scanning in a normal condition and a field inserted condition, respectively.
Figure 1B:
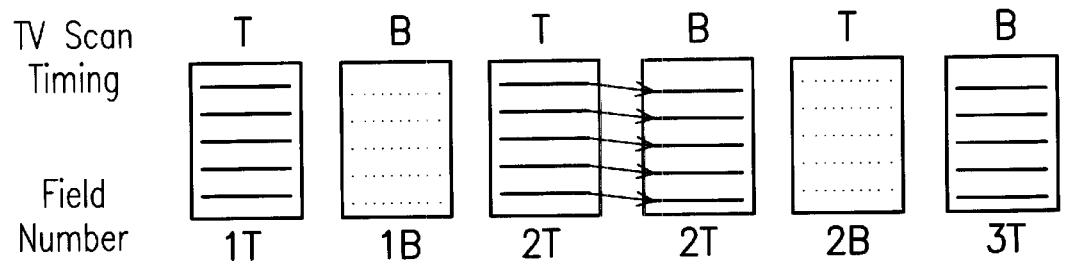

To distinguish the invention from the prior art, the description of FIG. 2 begins at the insertion of the second field 2T shown in FIGS. 1A, 1B.

As stated in the prior art, if a second field 2T is repeatedly inserted right after a first field 2T is displayed. At this time, the second field 2T will be displayed at a bottom scan timing (B), causing a down jitter on a TV screen. To resolve the problem of the down jitter, first transform equations are provided in the invention to previously convert the second field 2T into another second field 2T(B) shown in FIG. 2, thereby making the second field 2T(B) look like a bottom field video which is suitable to be displayed at the bottom scan timing (B). The first transform equations are given as follows:

$$L(1)=\alpha \times L(2)+(1 \times \alpha) \times L(1)$$

$$L(2)=\alpha \times L(3)+(1 \times \alpha) \times L(2)$$

$$L(3)=\alpha \times L(4)+(1 \times \alpha) \times L(3)$$

$$L(n)=\alpha \times L(n+1)+(1-\alpha) \times L(n)$$

Wherein L(1), L(2), . . . , L(n) each represents a scan line of a top field video, and $\alpha \times L(2)+(1-\alpha) \times L(1) \sim \alpha \times L(n+1)+(1-\alpha) \times L(n)$ each indicates a scan line of a bottom field video, where $\alpha$ is an interpolation weighting value with the range of 0 to 1 (i.e., $0<\alpha<1$).

After the second field 2T(B) is displayed at the bottom scan timing, a field 2B is displayed at a top scan timing (T) and then, a field 3t is be displayed at a bottom scan timing (B). The field 3T can be converted into another field 3T(B) as shown in FIG. 2, thereby making the field 3T(B) look like a bottom field video. Additionally, the field 2B can be converted into another field 2B(T) through second transform equations to thereby make the field 2B(T) look like a top field video which is suitable to be displayed at a top scan timing (T). The second transform equations are given as follows:

$$L(1)=L(1)$$

$$L(2)=\alpha \times L(1)+(1-\alpha) \times L(2)$$

$$L(3)=\alpha \times L(2)+(1-\alpha) \times L(3)$$

$$L(n)=\alpha \times L(n-1)+(1-\alpha) \times L(n)$$

Wherein L(1), L(2), . . . , L(n) each represents a scan line of a top field video, and L(1), $\alpha \times L(1)+(1-\alpha) \times L(2) \sim \alpha \times L(n-1)+(1-\alpha) \times L(n)$ each indicates a scan line of a bottom field video where $\alpha$ is an interpolation weighting value with the range of 0 to 1 (i.e., $0<\alpha<1$).

With the interpolation by the first and second transform equations, the down and up jitters can be smoothly removed, and the flicker on the TV screen can also be eliminated.

Moreover, according to experiments, it shows that the interpolation weighting value $\alpha$ can be set at ⅛ or 1/16 for a better vision quality. In other words, small interpolation weighting value does not cause the problem of jitters or flickers.

In summary, an advantage of the invention is that field videos can be smoothly displayed without any jitters generated on the TV screen regardless of being at a top or a bottom scanning timing of a TV scanning timing and regardless of inserting or skipping a field right after any one field displayed.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of smoothly displaying field videos in an interlaced display, comprising the steps of:

displaying a top field video at a top scan timing;

converting the top field video into a bottom field video by transform equations; and displaying the bottom field video at a bottom scan timing;

wherein the transform equations are given as follows:

$$L(1)=\alpha \times L(2)+(1-\alpha) \times L(1)$$

$$L(2)=\alpha \times L(3)+(1-\alpha) \times L(2)$$

$$L(3)=\alpha \times L(4)+(1-\alpha) \times L(3)$$

$$L(n)=\alpha \times L(n+1)+(1-\alpha) \times L(n)$$

Wherein L(1), L(2), . . . , L(n) each represents a scan line of a top field video, respectively and $\alpha \times L(2)+(1-\alpha) \times L(1) \sim \alpha \times L(n+1)+(1-\alpha) \times L(n)$ each indicates a scan line of a bottom field video, where $\alpha$ is an interpolation weighting value with the range of 0 to 1 (i.e., $0<\alpha<1$).

2. The method as defined in claim 1, wherein the interpolation weighting value $\alpha$ is equal to ⅛ for a better vision quality.

3. The method as defined in claim 1, wherein the interpolation weighting value $\alpha$ is equal to 1/16 for a better vision quality.

4. A method of smoothly displaying field videos in an interlaced display, comprising the steps of:

displaying a bottom field video at a bottom scan timing;

converting the bottom field video into a top field video by transform equations; and displaying the top field video at a top scan timing;

wherein the transform equations are given as follows:

$$L(1)=L(1)$$

$$L(2)=\alpha \times L(1)+(1-\alpha) \times L(2)$$

$$L(3)=\alpha \times L(2)+(1-\alpha) \times L(3)$$

$$L(n)=\alpha \times L(n-1)+(1-\alpha) \times L(n)$$

Wherein L(1), L(2), . . . , L(n) each represents a scan line of a top field video, and $\alpha \times L(2)+(1-\alpha) \times L(1) \sim \alpha \times L(n+1)+(1-\alpha) \times L(n)$ each indicates a scan line of a bottom field video, respectively, where a is an interpolation weighting value with the range of 0 to 1 (i.e., $0<\alpha<1$).

5. The method as defined in claim 4, wherein the interpolation weighting value $\alpha$ is equal to ⅛ for a better vision quality.

6. The method as defined in claim 4, wherein the interpolation weighting value $\alpha$ is equal to 1/16 for a better vision quality.

* * * * *